(12) United States Patent
Takahashi et al.

(10) Patent No.: US 9,404,013 B2
(45) Date of Patent: Aug. 2, 2016

(54) COMPOSITE COATING FILM

(75) Inventors: Yoshio Takahashi, Kuki (JP); Toshiaki Okazaki, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 0 days.

(21) Appl. No.: 14/125,137

(22) PCT Filed: Aug. 9, 2012

(86) PCT No.: PCT/JP2012/070352
§ 371 (c)(1),
(2), (4) Date: Dec. 10, 2013

(87) PCT Pub. No.: WO2013/024785
PCT Pub. Date: Feb. 21, 2013

(65) Prior Publication Data
US 2014/0121317 A1    May 1, 2014

(30) Foreign Application Priority Data
Aug. 18, 2011  (JP) ................. 2011-178860

(51) Int. Cl.
B32B 15/08    (2006.01)
C09D 143/02   (2006.01)
C08G 18/62    (2006.01)
C08G 18/73    (2006.01)
C08G 18/22    (2006.01)
C09D 175/14   (2006.01)

(52) U.S. Cl.
CPC ............ *C09D 143/02* (2013.01); *C08G 18/222* (2013.01); *C08G 18/6291* (2013.01); *C08G 18/73* (2013.01); *C09D 175/14* (2013.01)

(58) Field of Classification Search
CPC .............................. C09D 143/02; C08L 43/02
USPC .......... 524/196, 435, 437, 413, 547, 556, 558
See application file for complete search history.

(56) References Cited

U.S. PATENT DOCUMENTS

| | | | |
|---|---|---|---|
| 6,417,277 B1 * | 7/2002 | Tomizaki et al. ............. | 525/192 |
| 2006/0036007 A1 | 2/2006 | Hsieh et al. | |
| 2006/0047085 A1 | 3/2006 | Trivedi | |

FOREIGN PATENT DOCUMENTS

| CN | 102031077 A | 4/2011 |
|---|---|---|
| EP | 0458245 A1 | 11/1991 |
| EP | 2762240 A1 | 8/2014 |
| JP | 51-21531 A | 2/1976 |
| JP | 2002069135 A | 3/2002 |
| JP | 2002-143765 A | 5/2002 |
| JP | 2003206437 A | 7/2003 |
| JP | 2008-063472 A | 3/2008 |
| JP | 2009191257 A | 8/2009 |
| JP | 2011122119 A | 6/2011 |
| WO | 2009001818 A1 | 12/2008 |
| WO | 2010/110166 A1 | 9/2010 |

OTHER PUBLICATIONS

Blank et al. http://wernerblank.com/ pdfiles/paper16.pdf.*
http://wernerblank.com/ downloads.htm#paper16.*
http://www.wernerblank.com/pdfiles/paper31.pdf (Dec. 2009).*
Japanese Patent Office, International Search Report issued in Application No. PCT/JP2012/070352, mailed Sep. 11, 2012, 3 pp.
European Patent Office, Extended European Search Report issued in corresponding European Patent Application No. 12823312.9 dated Apr. 9, 2015.
Chinese Patent Office; Office Action in Chinese Patent Application No. 201280031471.8 dated May 6, 2015; 16 pages.
The Korean Intellectual Property Office, Decision to Grant issued in corresponding Korean Patent Application No. 10-2013-7034116 and English-language translation dated Aug. 27, 2015.

* cited by examiner

*Primary Examiner* — Vu A Nguyen

(74) *Attorney, Agent, or Firm* — Wood, Herron & Evans, LLP

(57) ABSTRACT

The object of the present invention is to provide a coating composition which can provide a coating film having excellent adhesion to a chromium thin film under various conditions, and sufficient scratch resistance, and the present invention provides a coating composition for a chromium thin film formed on a substrate, wherein the coating composition includes: an acrylic copolymer (A) having a phosphate group and a hydroxyl group other than a hydroxyl group in the phosphate group; isocyanate (B); and a metal chelate (C).

3 Claims, No Drawings

COMPOSITE COATING FILM

TECHNICAL FIELD

The present invention relates to a coating composition for a chromium thin film.

Priority is claimed on Japanese Patent Application No. 2011-178860, filed Aug. 18, 2011, the content of which is incorporated herein by reference.

BACKGROUND ART

Residential buildings, automobiles, motorcycles, and the like include a lustrous element containing a metal thin film which is formed by evaporation, sputtering, wet-plating, or the like.

In order to form a metal thin film, for example, iron, aluminum, chromium, or the like is used. Among these metal thin films, a chromium thin film which is disclosed in Patent Document No. 1 has unique texture and excellent hardness and weatherability compared with the iron or aluminum thin film. Therefore, the chromium thin film has been widely used. The chromium thin film has excellent hardness and weatherability, therefore, it has not generally been used to form a coating film for protecting the chromium thin film.

PRIOR ART DOCUMENT

Patent Document

Patent Document No. 1: Japanese Unexamined Patent Application, First Publication No. 2008-63472

DISCLOSURE OF THE INVENTION

Problems to be Solved

However, metal thin films have been desired to have higher durability performance. Due to this, surface cloudiness caused in a weatherability test or the like comes into question. Therefore, formation of a coating film on the chromium thin film has been examined. However, the chromium thin film has lower adhesion than that of other metal thin films. Therefore, a coating composition which can provide a coating film having high adhesion to the chromium thin film and sufficient scratch resistance has not been found.

In consideration of the above-described problems, it is an object of the present invention is to provide a coating composition for a chromium thin film which can provide a coating film having high adhesion to the chromium thin film under various conditions and sufficient scratch resistance.

Means for Solving the Problem

The coating composition for a chromium thin film according to the present invention is a coating composition for a chromium thin film formed on a substrate, wherein the coating composition includes an acrylic copolymer (A) having a phosphate group and a hydroxyl group other than a hydroxyl group in the phosphate group, isocyanate (B), and a metal chelate (C).

The acrylic copolymer (A) is a copolymer in which a monomer composition containing at least a monomer (a) having a phosphate group, and a monomer having a hydroxyl group and no phosphate group is polymerized. It is preferable that the ratio of the monomer (a) in the monomer composition be in a range of 0.2 to 20% by mass.

It is also preferable that the hydroxyl value of the acrylic copolymer (A), which is derived from the monomer (b), be in a range of 10 to 200 mgKOH/g.

It is also preferable that the metal chelate (C) be contained in the coating composition in a range of 0.1 to 10 parts by mass relative to 100 parts by mass of the acrylic polymer (A).

Effects of the Present Invention

According to the coating composition of the present invention, it is possible to provide a coating film which has excellent adhesion to the chromium thin film under various conditions, and sufficient scratch resistance.

DESCRIPTION OF EMBODIMENTS

The present invention is explained in detail below.

The coating composition for a chromium thin film (may be simply abbreviated to "coating composition" below) according to the present invention is a coating composition for making a coating film on a chromium thin film formed on a substrate. The coating composition includes an acrylic copolymer (A), isocyanate (B), and a metal chelate (C).

(Acrylic Copolymer (A))

The acrylic copolymer (A) has a phosphate group and a hydroxyl group other than a hydroxyl group in the phosphate group. It is possible to produce a coating film having excellent adhesion under various conditions by using the acrylic copolymer (A) having a phosphate group. In the present description, "adhesion under various conditions" means initial adhesion, adhesion after cleaning (adhesion of the coating film after the coating film is applied with high pressure water for a certain period of time), adhesion after a weatherability test, and the like. In addition, when the acrylic copolymer (A) has a hydroxyl group other than a hydroxyl group in the phosphate group, the hydroxyl group reacts with the isocyanate (B), and makes an excellent coating film.

The acrylic copolymer (A) is formed by the monomer composition containing the monomer (a) having a phosphate group, the monomer (b) having a hydroxyl group and no phosphate group, and if necessary, a monomer (c).

Examples of the monomer (a) having a phosphate group include mono(2-acryloyloxyethyl)acid phosphate, mono(2-methacryloyloxyethyl)acid phosphate, diphenyl(2-acryloyloxyethyl)phosphate, diphenyl(2-methacryloyloxyethyl)phosphate, phenyl(2-acryloyloxyethyl)phosphate, acid.phosphoxyethylmethacrylate, methacryloyl.oxyethyl acid phosphate.monoethanol amine salt, 3-chloro-2-acid.phosphoxypropylmethacrylate, acid.phosphoxypolyoxyethylene glycol monomethacrylate, acid.phosphoxypolyoxypropylene glycol methacrylate, (meth)acryloyloxyethylacid phosphate, (meth)acryloyloxypropyl acid phosphate, (meth)acryloyloxy-2-hydroxypropyl acid phosphate, (meth)acryloyloxy-3-hydroxypropyl acid phosphate, (meth)acryloyloxy-3-chrolo-2-hydroxypropyl acid phosphate, and allyl alcohol acid phosphate. The monomer can be used alone or in combination of two or more.

Examples of the representative monomer (a) having a phosphate group include Phosmer PE (Uni-chemical Co. Ltd.: acid phosphoxypolyoxyethylene glycol monomethacrylate), and LIGHT ESTER P-1M (Kyoeisha Chemical Co., Ltd: 2-methacryloyloxyethyl acid phosphate).

Examples of the monomer (b) having a hydroxyl group and no phosphate group include hydroxyethyl(meth)acrylate, hydroxypropyl(meth)acrylate, and 4-hydroxybutyl(meth)acrylate. The monomer can be used alone or in combination of two or more.

As the monomer (c) added if necessary, acrylic monomer is preferably used because of its high reactivity and ease of availability. Among acrylic monomers, a monomer having no aromatic ring is preferable because the coating film obtained has excellent weatherability. Examples of the monomer (c) added if necessary include methyl(meth)acrylate, ethyl (meth)acrylate, propyl(meth)acrylate, butyl n-(meth)acrylate, butyl t-(meth)acrylate, isobutyl(meth)acrylate, 2-ethylhexyl(meth)acrylate, lauryl(meth)acrylate, cyclohexyl (meth)acrylate, stearyl(meth)acrylate, isobonyl(meth) acrylate, and vinyl cyclohexane. The monomer can be used alone or in combination of two or more.

The ratio of the monomer (a) having a phosphate group in the monomer composition containing the monomers (a) to (c) is preferably in a range of 0.2 to 20% by mass, more preferably 1.0 to 10% by mass, and most preferably 2.0 to 3.0% by mass. When the ratio of the monomer (a) is the lower limit or more, the adhesion of the coating film under various conditions is excellent due to the phosphate group. In contrast, when the ratio of the monomer (a) is the upper limit or less, hydrophilicity is not too high. Due to this, for example, when the coating film obtained is immersed in warm water at about 40° C. for a certain period of time, the coating film does not whiten, that is, the coating film has excellent warm water resistance.

The ratio of the monomer (b) having a hydroxyl group and no phosphate group in the monomer composition containing the monomers (a) to (c) is preferably adjusted such that the hydroxyl value of the acrylic copolymer (A), which is derived from the monomer (b), is in a range of 10 to 200 mgKOH/g, more preferably 30 to 120 mgKOH/g, and most preferably 50 to 80 mgKOH/g. When the hydroxyl value is the lower limit or more, the scratch resistance of the coating film is excellent. In contrast, when the hydroxyl value is the upper limit or less, shrinkage due to crosslinking of the coating film is not too large, and washability is excellent.

The acrylic copolymer (A) can be produced by mixing the monomer composition explained above, and if necessary, a solvent, and a polymerization initiator, and reacting them under inert gas atmosphere such as nitrogen, at 50 to 110° C. for 5 to 15 hours.

Examples of the solvent used include hydrocarbon solvent such as toluene, xylene, solvent naphtha, methylcyclohexane, and ethylcyclohexane; ester solvent such as ethylacetate, butyl acetate, and ethylene glycol monomethyl ether acetate; and ketone solvent such as acetone, methyl ethyl ketone, methyl isobutyl ketone, and diisobutyl ketone. The solvent can be used alone or in combination of two or more.

Examples of the polymerization initiator used include 2,2'-azobisisobutylonitrile, 2,2'-azobis(4-methoxy-2,4-dimethyvaleronitrile), 2,2'-azobis(2,4-dimethyvaleronitrile), 2,2'-azobis(2-methylbutylonitrile), dimethyl-2,2'-azobisisobutylate, 1,1'-azobis(1-cyclohexanecarbonitrile), 2-(carbamoylazo)-isobutylonitrile, 2,2'-azobis(2,4,4-trimethylpentane), 2-phenylazao-2',4-dimethyl-4'-methoxyvaleronitrile, and 2,2'-azobis(2-methylpropane), ketone peroxide such as methyl ethyl ketone peroxide, acetylacetone peroxide, and cyclohexanone peroxide, 2,2-bis(tert-butylperoxy) butane, tert-butyl hydroperoxide, cumene hydroperoxide, 1,1,3,3-tetramethylbutyl hydroperoxide, di-tert-butyl peroxide, tert-butylcumyl peroxide, di-cumyl peroxide, α-(tert-butyl peroxy)isopropylbenzene, isobutyl peroxide, octanoyl peroxide, decamethyl peroxide, lauryl peroxide, 3,5,5-trimethyl hexanoyl peroxide, benzoyl peroxide, m-tolyl peroxide, di-isopropylperoxydicarbonate, di-2-ethylhexylperoxydicarbonate, di-n-propylperoxydicarbonate, di-2-ethoxyethylperoxycarbonate, di-ethoxyisopropylperoxydicarbonate, di(3-methyl-3-methoxybutyl)peroxycarbonate, acetylcyclohexylsulfonyl peroxide, tert-butylperoxyacetate, tert-butylperoxyisobutyrate, tert-butylperoxy-2-ethyhexarate, tert-butylperoxylaurate, tert-butyl-oxybenzoate, tert-butylperoxyisopropyl carbonate, di-tert-butylperoxyisophthalate, tert-butylperoxyallyl carbonate, isoamylperoxy-2-ethylhexanoate, di-tert-butylperoxyhexahydroterephthalate, and tert-butylperoxyazelate.

The glass transition point of the acrylic polymer (A) is preferably in a range of −20 to 90° C., more preferably 1 to 50° C., and most preferably 30 to 40° C. When the glass transition point of the acrylic polymer (A) is the lower limit or more, the coating film has excellent scratch resistance. In contrast, when the glass transition point is the upper limit or less, the coating film has excellent impact resistance.

The weight-average molecular weight of the acrylic polymer (A) is preferably in a range of 5,000 to 200,000, more preferably 10,000 to 150,000, and most preferably 50,000 to 90,000.

When the weight-average molecular weight of the acrylic polymer (A) is the lower limit or more, the coating film has excellent scratch resistance. In contrast, when the weight-average molecular weight is the upper limit or less, the coating film has excellent leveling.

(Isocyanate (B))

The isocyanate (B) reacts with the hydroxyl group in the acrylic polymer (A). Examples of the isocyanate (B) include aliphatic isocyanate such as hexamethylene diisocyanate, alicyclic isocyanate such as hydrogenated xylene diisocyanate, hydrogenated diphenylmethane diisocyanate, hydrogenated tolylene diisocyanate, norbornane diisocyanate, isophorone diisocyanate, and dicyclohexylmethane diisocyanate. The isocyanate can be used alone or in combination of two or more. The isocyanate (B) is preferably aliphatic or alicyclic monomer having no aromatic ring, because the coating film having excellent weatherability can be obtained.

The amount of the isocyanate (B) added is preferably adjusted such that the ratio (NCO/OH) between the NCO group in the isocyanate (B) and OH group in the acrylic polymer (A) is in a range of 0.3 to 3, more preferably 0.7 to 2, and most preferably 1 to 1.5. When the ratio (NCO/OH) is the lower limit or more, the coating film has excellent warm water resistance. In contrast, when the ratio (NCO/OH) is the upper limit or less, the coating film has excellent impact resistance.

(Metal Chelate (C))

The metal chelate (C) is a component for improving the scratch resistance of the coating film. Examples of the metal chelate (C) include aluminum chelate such as aluminum ethyl acetoacetate.diosopropylate (trade name: ALCH; Kawaken Fine Chemicals Co., Ltd.), aluminum alkyl acetoacetate.diosopropylate (trade name: Alumichelate M; Kawaken Fine Chemicals Co., Ltd.), aluminum bisethyl acetoacetate.monoacetylacetonate (trade name: Alumichelate D; Kawaken Fine Chemicals Co., Ltd.), and acetoalkoxyaluminum diisopropylate (trade name: PLENACT AL-M; Ajinomoto Fine-Techno Co., Inc.). The metal chelate can be used alone or in combination of two or more.

In addition, examples of the metal chelate (C) other than aluminum chelate include titanium chelate such as titanium diisopropoxy bis(acetylacetonate) (trade name: ORGATIX TC100; Matsumoto Fine Chemical Co., Ltd.), titanium tetraacetylacetonate (trade name: ORGATIX TC401; Matsumoto Fine Chemical Co., Ltd.), titanium di-2-ethylhexoxybis (2-ethyl-3-hydroxyhexoxide) (trade name: ORGATIX TC200; Matsumoto Fine Chemical Co., Ltd.), titanium diisopropoxybis(ethylacetoacetate) (trade name: ORGATIX TC750; Matsumoto Fine Chemical Co., Ltd.), di-i-propoxy- .bis(acetylacetonato)titanium (trade name: T-50; Nippon Soda Co., Ltd.), and propanedioxytitanium bis(ethylacetoacetate) (trade name: T-60; Nippon Soda Co., Ltd.). The titanium chelate can be used alone or in combination of two or more.

The amount of the metal chelate (C) added is preferably in a range of 0.1 to 10 parts by mass relative to 100 parts by mass of the acrylic polymer (A), more preferably 0.5 to 3 parts by mass, and most preferably 1 to 2 parts by mass. When the amount of the metal chelate (C) added is the lower limit or more, the coating film has high scratch resistance. In contrast, when the amount is the upper limit or less, the coating composition has excellent storage ability, and sufficiently long working life.

The coating composition may contain a solvent, a surface conditioner, a thixotropic agent, an ultraviolet absorber, a light stabilizer, and the like in addition to the acrylic polymer (A), the isocyanate (B), and the metal chelate (C). It is preferable to add 2 to 8 parts by mass of the ultraviolet absorber, 1 to 4 parts by mass of the light stabilizer relative to 100 parts by mass of the acrylic polymer (A), because the coating film having further improved weatherability can be obtained.

Examples of the solvent include hydrocarbon solvent such as toluene, xylene, solvent naphtha, methylcyclohexane, and ethylcyclohexane; ester solvent such as ethyl acetate, butyl acetate, and ethylene glycol monomethyl ether acetate; and ketone solvent such as acetone, methyl ethyl ketone, methyl isobutyl ketone, diisobutyl ketone, and cyclohexanone, and alcohol solvent such as ethyl alcohol, propyl alcohol, isopropyl alcohol, 1-butyl alcohol, 2-butyl alcohol, 2-methyl-1-propanol, and 2-methyl-2-propanol. The solvent can be used alone or in combination of two or more.

The coating composition can be produced by mixing these components. The coating film can be produced by applying the obtained coating composition obtained on a chromium thin film formed on a substrate.

As the chromium thin film, for example, a thin film having a thickness of 5 to 150 nm, which is produced by evaporating, sputtering, wet-plating, or the like, can be used.

As the substrate, a building material used in a building such as a house, a molded article which is a part for automobiles or motorcycles can be used. Examples of the material of the molded article include metals such as aluminum, iron, stainless, zinc, copper, and a tin plate, and resin such as ABS (acrylonitrile-butadiene-styrene copolymer), PC (polycarbonate), PC/ABS (alloy of polycarbonate and acrylonitrile-butadiene-styrene copolymer), polyamide, PP (polypropylene), ASA (acrylonitrile-styrene-methyl acrylate copolymer), PBT (polybutylene terephthalate), and PET (polyethylene terephthalate).

In addition, another layer such as a base coat obtained by an ordinary base coat composition may be formed between the substrate and the chromium thin film. Furthermore, another layer may be formed on the coating film.

As a coating method for the coating composition, for example, a spray coating method, brush coating method, roller coating method, curtain coating method, flow coating method, dip coating method, and the like can be used. After coating, the coating film can be produced by hot drying at 70 to 90° C. The thickness of the coating film after drying is preferably in a range of 5 to 60 μm.

As explained above, the coating composition includes an acrylic copolymer (A) having a phosphate group and a hydroxyl group other than a hydroxyl group in the phosphate group, the isocyanate (B), and the metal chelate (C). Therefore, it is possible to provide a coating film which has excellent adhesion to the chromium thin film under various conditions, and sufficient scratch resistance. The coating film obtained has excellent leveling properties, impact resistance, warm water resistance, and weatherability (appearance).

EXAMPLES

Below, the present invention is explained in detail referring to examples.

[Manufacturing of Acrylic Polymer (A-1) to (A-13)]

Amounts (parts by mass) of monomers and AIBN as shown in Table 1, and 100 parts by mass of toluene were put into a reaction vessel having three necks. Then, the air inside the reaction vessel was replaced with nitrogen. Under the nitrogen atmosphere, the reaction solution in the reaction vessel was heated to 75° C. while stirring to react. The reaction time was adjusted as shown in Table 1. After completion of the reaction, the reaction solution in the reaction vessel was diluted with ethyl acetate and the solid component thereof was adjusted to 30% by mass. Consequently, the acrylic polymer (A-1) to (A-13) shown in Table 1 was produced.

The glass transition point (Tg), hydroxyl value, and mass average molecular weight of the acrylic polymer (A-1) to (A-13) are shown in Table 1.

The measuring method of these parameters is explained below.

(1) Glass Transition Point:

The glass transition point was measured in accordance with JIS K7121 using a differential scanning calorimeter (Shimadzu Corporation; DSC-60A).

(2) Hydroxyl Value:

The hydroxyl value was measured in accordance with JIS K1557.

(3) Mass Average Molecular Weight:

The mass average molecular weight was measured by a gel-permeation chromatography method.

TABLE 1

|  | A-1 | A-2 | A-3 | A-4 | A-5 | A-6 | A-7 | A-8 | A-9 | A-10 | A-11 | A-12 | A-13 |
|---|---|---|---|---|---|---|---|---|---|---|---|---|---|
| MMA [parts by mass] | 30 | 28 | 23 | 28 | 40 | 35 | 14 |  | 80 | 25 | 25 | 28 | 42 |
| n-BMA [parts by mass] | 50 | 51 | 49 | 40 | 48 | 49 | 43 | 67 | 3.5 | 34 | 17 | 51 | 46 |
| HEMA [parts by mass] | 12 | 15.5 | 19 | 15.5 |  | 14 |  |  | 15.5 | 28.5 | 38 | 15.5 |  |
| 4-hydroxybutyl acrylate [part by mass] |  |  |  | 3 |  |  | 17 | 8 |  |  | 10 |  |  |
| BA [parts by mass] | 7.8 | 4 | 6.7 | 13.5 | 6.7 |  |  |  |  | 10.2 |  | 5.5 | 10 |
| 2-EHA [parts by mass] |  |  |  |  |  |  | 6 | 22.7 |  |  |  |  |  |

TABLE 1-continued

| | A-1 | A-2 | A-3 | A-4 | A-5 | A-6 | A-7 | A-8 | A-9 | A-10 | A-11 | A-12 | A-13 |
|---|---|---|---|---|---|---|---|---|---|---|---|---|---|
| Light ester P-1M [parts by mass] | 0.2 | 1.5 | 2.3 | 3 | 2.3 | 2 | 20 | 2.3 | 1 | 2.3 | 10 | | 2 |
| Total [parts by mass] | 100 | 100 | 100 | 100 | 100 | 100 | 100 | 100 | 100 | 100 | 100 | 100 | 100 |
| AIBN [parts by mass] | 6 | 3 | 2 | 1.5 | 1 | 10 | 4 | 3 | 1.2 | 0.8 | 1.2 | 2 | 2 |
| Reaction time [hour] | 12 | 10 | 10 | 10 | 12 | 6 | 8 | 8 | 10 | 12 | 12 | 10 | 10 |
| Glass transition point: Tg [° C.] | 35 | 40 | 35 | 30 | 35 | 50 | 1 | −20 | 90 | 35 | 35 | 40 | 40 |
| Hydroxyl value [mgKOH/g] | 50 | 65 | 80 | 65 | 10 | 60 | 65 | 30 | 65 | 120 | 200 | 65 | 0 |
| Mass average molecular weight | 10000 | 50000 | 75000 | 90000 | 150000 | 5000 | 25000 | 35000 | 110000 | 200000 | 130000 | 75000 | 75000 |

The abbreviations in Table 1 mean the following.
MMA: methylmethacrylate
n-BMA: n-butylmethacrylate
HEMA: hydroxyethylmethacrylate
BA: butylacrylate
2-EHA: 2-ethylhexylacrylate
Lite ester P-1M: Kyoeisha Chemical Co., Ltd.; 2-methacryloyloxy ethyl acid phosphate
AIBN: azobisisobutylonitrile

[Examples 1 to 18] and [Comparative Examples 1 to 3]

The coating composition was prepared by mixing components with a mixing ratio (parts by mass) shown in Tables 2 and 3. Moreover, the amount of the acrylic polymer (A) added in Tables 2 and 3 is a value in terms of a solid content conversion.

Then the resulting coating composition was applied on a hard chromium plate, which was obtained by plating on a steel sheet, by spraying such that the thickness after drying was 20 µm, and dried at 80° C. for 30 minutes to form a coating film (coating). Thereby, a test piece was produced.

Then, as shown in Tables 2 and 3, the adhesion (initial adhesion, adhesion after cleaning, adhesion after weatherability test) in various conditions, scratch resistance, leveling, impact resistance, warm water resistance, and weatherability (appearance) were evaluated using the test piece. The results are shown in Tables 2 and 3.

Moreover, references 1 to 18 are Examples, and references 19 to 21 are Comparative Examples.

[Evaluation]

(1) Initial Adhesion

The test piece was nicked using a cutter with a grid pattern of 10×10 having 1 mm width. Then, a tape (Nichiban Co., Ltd.; CELLOTAPE®) was adhered to the grid pattern and then peeled. The initial adhesion between the chromium plate and the coating film was evaluated based on the following standard.

⊚: Peeling was never confirmed.
○: A small amount of peeling was confirmed along the line or the corner of the grid pattern, but there was no problem in practical use.
Δ: There was no square in which the area of half or more was peeled, and there was no problem in practical use.
X: Peeling was confirmed in one or more squares.

(1) Scratch Resistance

The test piece was rubbed using cannequine No. 3 cotton with a load of 500 g/cm³ 5 round trips. Then, the condition of the surface of the test piece was observed. The condition was evaluated based on the following standard.

⊚: Scratches were never confirmed.
○: Less than 3 scratches were confirmed, but there was no problem in practical use.
Δ: 3 or more of scratches were confirmed, but there was no problem in practical use.
X: Many conspicuous scratches were confirmed.

(2) Leveling (Smoothness)

The condition of the surface of the test piece was observed. The condition was evaluated based on the following standard.

⊚: The surface was smooth.
○: A small amount of fine orange peeling was confirmed, but there was no problem in practical use.
Δ: Orange peeling was confirmed, but there was no problem in practical use.

(4) Impact Resistance

Using a Dupont-type tester, impact resistance was evaluated under conditions of: firing pin: ½ inch, 500 g, and height: 50 cm. The condition was evaluated based on the following standard.

⊚: Conspicuous puncture was never confirmed.
○: Slight wrinkling was confirmed at the part that the pin hit, but there was no problem in practical use.
Δ: Wrinkling was confirmed at the part that the pin hit, but peeling was not confirmed, and there was no problem in practical use.

(5) Warm Water Resistance

The test piece was immersed in warm water at 40° C. for 240 hours, and then the condition of the test piece was confirmed just after and 24 hours after the test completion. The condition was evaluated based on the following standard.

⊚: Change was not confirmed between before and after the test.
○: Slight whitening was partially confirmed just after the test completion, but the whitening disappeared after 24 hours, and there was no problem in practical use.
Δ: Whitening was wholly confirmed, but the whitening disappeared after 24 hours, and there was no problem in practical use.

(6) Adhesion After Cleaning

After making a nick in an X shape in the test piece using a cutter, water was applied to the surface with 8 MPa for 30 seconds, and the surface was evaluated in accordance with the following standard.

⊚: Change was not confirmed between before and after the test.
○: Slight stripe-shaped peeling was confirmed along the nick, but there was no problem in practical use.

Δ: Stripe-shaped peeling was confirmed along the nick, but the length from the end to the base of the peeling portion was small, such as 1 mm or less, and there was no problem in practical use.

X: Peeling was confirmed along the nick.

(7) Weatherability (Appearance), and Adhesion After Weatherability Test

The test piece was set in an accelerated weathering testing apparatus (Suga Test Instruments Co., Ltd.; Sunshine weather meter WL-SUN-DC-B type), and an accelerated deterioration test of the test piece was carried out under conditions of: temperature: 63° C., irradiation time of artificial sunray: 2,000 hours, injection time of water during the irradiation time: 400 hours. Then, the weatherability (appearance) and adhesion (adhesion after weatherability test) between the chromium plate and the coating film were evaluated in the same manner as that of (1) Initial adhesion. The standard in the adhesion after weatherability test was the same as that of (1) Initial adhesion. In the weatherability (appearance), ◎ means there was no problem in the surface conditions.

TABLE 2

| | | 1 | 2 | 3 | 4 | 5 | 6 | 7 | 8 | 9 | 10 |
|---|---|---|---|---|---|---|---|---|---|---|---|
| Acrylic polymer (A) | Type | A-2 | A-3 | A-4 | A-2 | A-3 | A-2 | A-2 | A-2 | A-3 | A-4 |
| | [parts by mass] | 100 | 100 | 100 | 100 | 100 | 100 | 100 | 100 | 100 | 100 |
| Isocyanate (B) | DURANATE ® 24A-100 | 6.2 | | 20.7 | | 51 | 62.1 | 26.9 | | | 26.9 |
| [parts by mass] | Desmodur N3300 | | 19.2 | | 33.5 | | | | 29 | 35.7 | |
| Metal chelate (C) | ALCH | 1.5 | 1.5 | | 2 | 1 | 2 | 0.1 | | 3 | 10 |
| [parts by mass] | PLENACT ® AL-M | | | 1 | | | | | 0.5 | | |
| Solvent | Ethyl acetate | 100 | 100 | 100 | 100 | 100 | 100 | 100 | 100 | 100 | 100 |
| [parts by mass] | Butyl acetate | 50 | 50 | 50 | 50 | 50 | 50 | 50 | 50 | 50 | 50 |
| | Cyclohexanone | 20 | 20 | 20 | 20 | 20 | 20 | 20 | 20 | 20 | 20 |
| Surface conditioner [parts by mass] | BYK-330 | 0.5 | 0.5 | 0.5 | 0.5 | 0.5 | 0.5 | 0.5 | 0.5 | 0.5 | 0.5 |
| Ultraviolet absorber [parts by mass] | Tinuvin 328 | 6 | 6 | 6 | 6 | 6 | 6 | 6 | 6 | 6 | 6 |
| Light stabilizer [parts by mass] | Tinuvin 292 | 4 | 4 | 4 | 4 | 4 | 4 | 4 | 4 | 4 | 4 |
| | NCO/OH | 0.3 | 0.7 | 1 | 1.5 | 2 | 3 | 1.3 | 1.3 | 1.3 | 1.3 |
| Evaluation | Initial adhesion | ◎ | ◎ | ◎ | ◎ | ◎ | ◎ | ◎ | ◎ | ◎ | ◎ |
| | Scratch resistance | ◎ | ◎ | ◎ | ◎ | ◎ | ◎ | Δ | ○ | ○ | Δ |
| | Leveling (smoothness) | ◎ | ◎ | ◎ | ◎ | ◎ | ◎ | ◎ | ◎ | ◎ | ◎ |
| | Impact resistance | ◎ | ◎ | ◎ | ◎ | ○ | Δ | ◎ | ◎ | ◎ | ◎ |
| | Warm water resistance (whiteness) | Δ | ○ | ◎ | ◎ | ◎ | ◎ | ◎ | ◎ | ◎ | ◎ |
| | Adhesion after cleaning | ◎ | ◎ | ◎ | ◎ | ◎ | ◎ | ◎ | ◎ | ◎ | ◎ |
| | Weatherability (appearance) | ◎ | ◎ | ◎ | ◎ | ◎ | ◎ | ◎ | ◎ | ◎ | ◎ |
| | Adhesion after weatherability test | ◎ | ◎ | ◎ | ◎ | ◎ | ◎ | ◎ | ◎ | ◎ | ◎ |

TABLE 3

| | | 11 | 12 | 13 | 14 | 15 | 16 | 17 | 18 | 19 | 20 | 21 |
|---|---|---|---|---|---|---|---|---|---|---|---|---|
| Acrylic polymer (A) | Type | A-1 | A-5 | A-6 | A-7 | A-8 | A-9 | A-10 | A-11 | A-2 | A-12 | A-13 |
| | [parts by mass] | 100 | 100 | 100 | 100 | 100 | 100 | 100 | 100 | 100 | 100 | 100 |
| Isocyanate (B) | DURANATE ® 24A-100 | 15.9 | 4.1 | | | 14.3 | 31.1 | 49.7 | | 31.1 | | |
| [parts by mass] | Desmodur N3300 | | | 20.6 | 22.3 | | | | 68.7 | | 29 | |
| Metal chelate (C) | ALCH | 1 | | | 1 | 1 | 2 | | | | 1.5 | 2 |
| [parts by mass] | PLENACT ® AL-M | | 2 | 1 | | | | 2 | 1.5 | | | |
| Solvent | Ethyl acetate | 100 | 100 | 100 | 100 | 100 | 100 | 100 | 100 | 100 | 100 | 100 |
| [parts by mass] | Butyl acetate | 50 | 50 | 50 | 50 | 50 | 50 | 50 | 50 | 50 | 50 | 50 |
| | Cyclohexanone | 20 | 20 | 20 | 20 | 20 | 20 | 20 | 20 | 20 | 20 | 20 |
| Surface conditioner [parts by mass] | BYK-330 | 0.5 | 0.5 | 0.5 | 0.5 | 0.5 | 0.5 | 0.5 | 0.5 | 0.5 | 0.5 | 0.5 |
| Ultraviolet absorber [parts by mass] | Tinuvin 328 | 6 | 6 | 6 | 6 | 6 | 6 | 6 | 6 | 6 | 6 | 6 |
| Light stabilizer [parts of mass] | Tinuvin 292 | 4 | 4 | 4 | 4 | 4 | 4 | 4 | 4 | 4 | 4 | 4 |
| | NCO/OH | 1 | 1.3 | 1 | 1 | 1.5 | 1.5 | 1.3 | 1 | 1.5 | 1.3 | 0 |
| Evaluation | Initial adhesion | Δ | ◎ | ◎ | ◎ | ◎ | ○ | ◎ | ◎ | ◎ | x | ◎ |
| | Scratch resistance | ○ | Δ | Δ | ○ | Δ | ◎ | ◎ | ◎ | x | ◎ | x |
| | Leveling (smoothness) | ◎ | ○ | ◎ | ◎ | ◎ | ◎ | Δ | ◎ | ◎ | ◎ | ◎ |
| | Impact resistance | ◎ | ◎ | ○ | ◎ | ◎ | Δ | ◎ | ◎ | ◎ | ◎ | ◎ |
| | Warm water resistance (whiteness) | ◎ | ◎ | ◎ | Δ | ◎ | ◎ | ◎ | ○ | ◎ | ◎ | ◎ |
| | Adhesion after cleaning | Δ | ◎ | ◎ | ◎ | ◎ | ○ | ○ | Δ | ◎ | x | ◎ |
| | Weatherability (appearance) | ◎ | ◎ | ◎ | ◎ | ◎ | ◎ | ◎ | ◎ | ◎ | ◎ | ◎ |
| | Adhesion after weatherability test | Δ | ◎ | ◎ | ◎ | ◎ | ○ | ○ | Δ | ◎ | x | ◎ |

The abbreviations in Tables 2 and 3 mean the following.

DURANATE®: 24A-100: Asahi Kasei Chemicals Corporation, hexamethylene diisocyanate, NCO content: 23.5%

Desmodur N3300: Sumika Bayer Urethane Co., Ltd., hexamethylene diisocyanate, NCO content: 21.8%

ALCH: Kawaken Fine Chemicals Co., Ltd., aluminum ethylacetoacetate.diisopropylate PLENACT® AL-M: acetoalkoxyaluminium diisopropylate BYK®-330: BYK, surface conditioner Tinuvin 328: BASF Japan Ltd., ultraviolet absorber Tinuvin 292: BASF Japan Ltd., light stabilizer

INDUSTRIAL APPLICABILITY

According to the coating composition of the present invention, it is possible to produce a coating film having excellent adhesion to the chromium thin film under various conditions, and sufficient scratch resistance.

The invention claimed is:

1. A composite coating film comprising:
   a substrate, a chromium thin film formed on the substrate, and a coating film coated on the chromium thin film, wherein the coating film comprises a resin composition, the resin composition includes an acrylic copolymer (A) having a phosphate group and a hydroxyl group other than a hydroxyl group in the phosphate group; isocyanate (B); and a metal chelate (C),
   the metal chelate is aluminum chelate and/or titanium chelate, and
   the amount of the metal chelate (C) added is in a range of 1 part by mass to 2 parts by mass relative to 100 parts by mass of the acrylic polymer (A).

2. The composition coating film according to claim 1, wherein the acrylic copolymer (A) is a copolymer in which a monomer composition containing at least a monomer (a) having a phosphate group, and a monomer (b) having a hydroxyl group and no phosphate group is polymerized, and the ratio of the monomer (a) in the monomer composition is in a range of 0.2 to 20% by mass.

3. The composition coating film according to claim 2, wherein the hydroxyl value of the acrylic copolymer (A), which is derived from the monomer (b), is in a range of 10 to 200 mgKOH/g.

* * * * *